(12) United States Patent
Murata et al.

(10) Patent No.: US 9,477,078 B2
(45) Date of Patent: Oct. 25, 2016

(54) MEMS DEVICE (71) Applicant: KABUSHIKI KAISHA TOYOTA CHUO KENKYUSHO, Nagakute-shi, Aichi-ken (JP)

(72) Inventors: Kanae Murata, Nagoya (JP); Isao Aoyagi, Nagakute (JP); Yutaka Nonomura, Nagoya (JP); Teruhisa Akashi, Nagoya (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 464 days.

(21) Appl. No.: 14/079,295

(22) Filed: Nov. 13, 2013

(65) Prior Publication Data

US 2014/0132091 A1 May 15, 2014

(30) Foreign Application Priority Data

Nov. 15, 2012 (JP) ................................. 2012-251417

(51) Int. Cl.
*G02B 26/08* (2006.01)
*G02B 26/10* (2006.01)
(Continued)

(52) U.S. Cl.
CPC ............. *G02B 26/08* (2013.01); *G02B 26/085* (2013.01); *G02B 26/0825* (2013.01); *G02B 26/101* (2013.01); *H02K 33/00* (2013.01); *H02K 33/16* (2013.01); *H02K 2201/18* (2013.01)

(58) Field of Classification Search
CPC G02B 26/08; G02B 26/0825; G02B 26/101; G02B 26/085; G02B 26/10; G02B 26/0833; G02B 7/182; G02B 7/1821; G02B 7/198; G02B 17/002; H02K 33/16; H02K 33/00; H02K 33/02; H02K 33/12; H02K 2201/18
USPC ............... 359/224.1, 198, 230, 224.2, 200.7, 359/198.1; 310/36–39, 12.03; 257/415; 335/222
See application file for complete search history.

(56) References Cited

U.S. PATENT DOCUMENTS 6,108,118 A * 8/2000 Minamoto ........... G02B 26/085
310/36
2010/0046054 A1 2/2010 Jeong et al.
2010/0142020 A1 6/2010 Kim

FOREIGN PATENT DOCUMENTS

JP B2-4380233 12/2009
JP 2010049259 A 3/2010
(Continued)

OTHER PUBLICATIONS

Aoyanagi Isao; Ozaki Takashi; Fujitsuka Tokuo, Optical Deflector, Toyota Central R&D Labs Inc, JP 2011-197233, Jun. 10, 2011.*
(Continued)

*Primary Examiner* — Terrance Kenerly
*Assistant Examiner* — Alexander Singh
(74) *Attorney, Agent, or Firm* — Oliff PLC (57) ABSTRACT

A MEMS device includes a substrate, a moving part including a magnetic material and configured to tilt relative to the substrate, a first magnetic pole and a second magnetic pole configured to apply a magnetic field to the magnetic material, and a magnetic field detector configured to detect the magnetic field of the magnetic material. In the MEMS device, the first magnetic pole and the second magnetic pole are disposed on one side of the moving part, the one side being a side on which the magnetic material is located. The magnetic field detector is disposed between the first magnetic pole and the second magnetic pole. A distance between the first magnetic pole and the second magnetic pole is shorter than a length of the moving part in a direction from the first magnetic pole toward the second magnetic pole.

5 Claims, 7 Drawing Sheets

(51) Int. Cl.
*H02K 33/00* (2006.01)
*H02K 33/16* (2006.01)

(56) References Cited

FOREIGN PATENT DOCUMENTS

| JP | 2010107666 A | 5/2010 |
| JP | A-2011-32827 | 2/2011 |
| JP | 2011197233 A | * 10/2011 |
| JP | A-2011-197233 | 10/2011 |
| JP | A-2012-202741 | 10/2012 |

OTHER PUBLICATIONS

Nov. 11, 2014 Office Action issued in Japanese Application No. 2012-251417.

* cited by examiner

MEMS DEVICE

CROSS-REFERENCE TO RELATED APPLICATION

This application claims priority to Japanese Patent Application No. 2012-251417 filed on Nov. 15, 2012, the contents of which are hereby incorporated by reference into the present application.

TECHNICAL FIELD

The present application relates to a micro electro mechanical systems (MEMS) device.

DESCRIPTION OF RELATED ART

A MEMS device is known which includes a substrate and a moving part configured to tilt relative to the substrate. Such a MEMS device is applied as a light deflector. In such a light deflector, a mirror is fixed to the moving part, which is tilted relative to the substrate to adjust the angle of the mirror.

One method for tilting the moving part is electromagnetic driving. The moving part can be tilted by fixing a permanent magnet to the moving part and applying a magnetic field to the permanent magnet by an electromagnet. Furthermore, in the MEMS device a magnetic field detector such as a Hall element is preferably installed in order to detect the tilt angle of the moving part. The magnetic field detector is preferably disposed between magnetic poles of the electromagnet in order to accurately detect the tilt angle of the moving part. According to Japanese Patent Application Publication No. 2011-197233, the whole MEMS device including the Hall element is disposed between the magnetic poles of the electromagnet. Such disposition enables both application of a magnetic field to the permanent magnet of the moving part and arrangement of the magnetic field detector between the poles.

SUMMARY

As described in Japanese Patent Application Publication No. 2011-197233, when the whole MEMS device is disposed between the magnetic poles of the electromagnet, the size of the electromagnet needs to be increased.

A MEMS device disclosed herein includes a substrate, a moving part including a magnetic material and configured to tilt relative to the substrate, a first magnetic pole and a second magnetic pole configured to apply a magnetic field to the magnetic material, and a magnetic field detector configured to detect the magnetic field of the magnetic material. In the MEMS device, the first magnetic pole and the second magnetic pole are disposed on one side of the moving part, the one side being a side on which the magnetic material is located. The magnetic field detector is disposed between the first magnetic pole and the second magnetic pole. A distance between the first magnetic pole and the second magnetic pole is shorter than a length of the moving part in a direction from the first magnetic pole toward the second magnetic pole.

In the MEMS device, the first magnetic pole and the second magnetic pole are disposed on the side of the moving part on which the magnetic material is located. The magnetic field detector is disposed between the first magnetic pole and the second magnetic pole. Since the first magnetic pole and the second magnetic pole are disposed close to the magnetic material and the magnetic field detector is disposed between the first magnetic pole and the second magnetic pole, the tilt angle of the moving part can be accurately detected without reducing a driving force of the moving part. Furthermore, since the distance between the first magnetic pole and the second magnetic pole is shorter than the length of the moving part in the direction from the first magnetic pole toward the second magnetic pole, size of a member including the first magnetic pole and the second magnetic pole can be reduced, enabling contribution to miniaturization of the MEMS device.

DETAILED DESCRIPTION OF INVENTION

The present application provides a technology for providing a MEMS device which accurately detects a tilt angle of a moving part and which can be miniaturized.

The MEMS device disclosed in the present application includes a substrate, a moving part including a magnetic material and configured to tilt relative to the substrate, a first magnetic pole and a second magnetic pole configured to apply a magnetic field to the magnetic material, and a magnetic field detector configured to detect the magnetic field of the magnetic material. In the MEMS device, the first magnetic pole and the second magnetic pole are disposed on one side of the moving part, the one side being a side on which the magnetic material is located. The magnetic field detector is disposed between the first magnetic pole and the second magnetic pole. A distance between the first magnetic pole and the second magnetic pole is shorter than a length of the moving part in a direction from the first magnetic pole toward the second magnetic pole.

The MEMS device may further include a core including the first magnetic pole and the second magnetic pole, a coil wound around the core, and a supporting member supporting the magnetic field detector at a position between the first magnetic pole and the second magnetic pole of the core.

In the MEMS device, a distance between the magnetic material and the magnetic field detector is preferably shorter than a distance between the moving part and the substrate when the moving part maximally tilts relative to the substrate.

The MEMS device may include a core and a coil wound around the core. The core may include the first magnetic pole and the second magnetic pole disposed across the magnetic field detector, a first lateral extending portion extending from the first magnetic pole in a first direction of moving away from the magnetic field detector, a first longitudinal extending portion bent and extending from the first lateral extending portion in a second direction of moving away from the substrate, a second lateral extending portion extending from the second magnetic pole in an opposite direction to the first direction, a second longitudinal extending portion bent and extending from the second lateral extending portion in the second direction, and a connecting portion connecting the first longitudinal extending portion and the second longitudinal portion.

The connecting portion of the core of the MEMS device may include a third lateral extending portion bent and extending from the first longitudinal extending portion in the opposite direction to the first direction, a third longitudinal extending portion bent and extending from the third lateral extending portion in the second direction, a fourth lateral extending portion bending and extending from the second longitudinal extending portion in the first direction, a fourth longitudinal extending portion bent and extending from the fourth lateral extending portion in the second direction, and a tip connecting portion connecting a tip of the third longitudinal extending portion in the second direction and a tip of the fourth longitudinal extending portion in the second direction. In this case, the coil is preferably wound around the third longitudinal extending portion and the fourth longitudinal extending portion.

The MEMS device may further include a third magnetic pole. The magnetic field detector may be disposed between the first magnetic pole, the second magnetic pole, and the third magnetic pole.

The description further discloses a MEMS device including a substrate, a moving part including a magnetic material and configured to tilt relative to the substrate, and a first magnetic pole and a second magnetic pole configured to apply a magnetic field to the magnetic material, wherein both of a distance between the magnetic material and the first magnetic pole and a distance between the magnetic material and the second magnetic pole are shorter than a distance between the moving part and the substrate when the moving part maximally tilts relative to the substrate.

Representative and non-limiting specific examples of the present invention are described herein with referring to the drawings. The detailed description merely intends to illustrate the details to a person skilled in the art for carrying out the preferred examples of the present invention, while it does not intend to limit the scope of the present invention. Additional features and teachings may be used separately or in conjunction with other features or teachings in order to provide a further improved MEMS device.

Combinations of the features and steps disclosed above in the detailed description are not requisite for carrying out the present invention in its broadest meaning, but are particularly described merely for illustrating representative specific examples of the present invention. Various features of the above-described representative specific examples as well as various features of those described in independent and dependent claims are not the ones which have to be combined as the specific examples or in the same order as described herein in order to provide additional and useful modes of the present invention.

All features described in the present application and/or claims intend to be disclosed, individually and independently each other, as limitations for specific items described in the disclosure and claims at the time of filing the present application, separately from a structure of the features described in examples and/or claims. Descriptions on all numerical ranges and groups or sets intend to disclose intermediate aspects thereof as limitations for specific items described in the disclosure and claim at the time of filing the present application.

Embodiment 1

Figure 1:
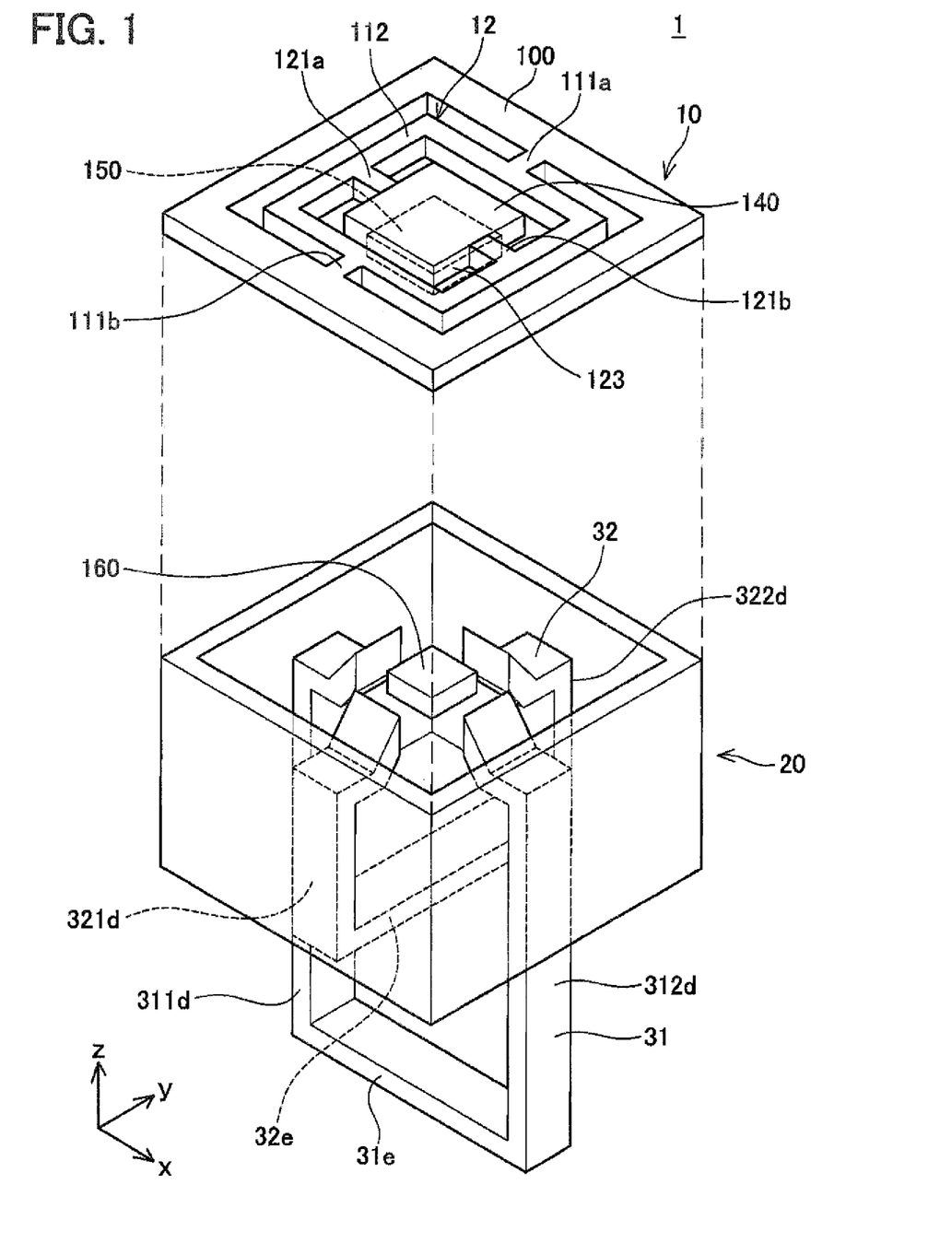
FIG. 1 is a perspective view showing a general configuration of a light deflector 1.

A light deflector 1 that is a MEMS device according to an embodiment will be described below with reference to FIG. 1 to FIG. 3. The light deflector 1 includes an upper substrate 10, a lower substrate 20, a moving part 12, and cores 31 and 32. FIG. 1 shows that the upper substrate 10 and the lower substrate 20 are separate from each other. However, actually, a lower surface of the upper substrate 10 is joined to an upper surface of the lower substrate 20. As shown in FIG. 1, an upper portion (in a positive direction of a z axis) of the cores 31 and 32 is accommodated inside the lower substrate 20. The upper substrate 10 and the moving part 12 are integrally formed by a MEMS technique using a semiconductor substrate as a material. The lower substrate 20 is formed of a nonmagnetic material, and the cores 31 and 32 are fixed to the upper substrate 10 via the lower substrate 20. Coils are wound around the cores 31 and 32, respectively, but are not shown in the drawings.

The moving part 12 has a gimbal structure and includes a supporting frame 112, a mirror structure 140, flexible beams 111a and 111b that connect the upper substrate 10 and the supporting frame 112 together, and flexible beams 121a and 121b that connect the supporting frame 112 and the mirror structure 140 together. The flexible beams 111a and 111b extend in the direction of a y axis shown in FIG. 1 and are twisted around the y axis. This allows the supporting frame 112 to rotate around the y axis and also allows the opposite ends of the supporting frame 112 in an x direction to be tilted in a z direction relative to the upper substrate 10. The flexible beams 121a and 121b extend in the direction of an x axis shown in FIG. 1 and are twisted around the x axis. This allows the mirror structure 140 to rotate around the x axis and also allows the opposite ends of the supporting frame 112 in the y direction to be tilted in the z direction relative to the upper substrate 10.

An upper surface (a surface in a positive direction of a z axis) of the mirror structure 140 forms a mirror to deflect light. A cuboid-shaped permanent magnet 150 is fixed to a lower surface (a surface in a negative direction of the z axis) of the mirror structure 140. The permanent magnet 150 may be, for example, a neodymium magnet ($Nd_2Fe_{14}B$), a samarium cobalt magnet ($SmCo_5$ (1 to 5), $Sm_2Co_{17}$ (2-17), or the like), or a ferrite magnet. A side (the positive direction side of the z axis) of the permanent magnet 150 which is closer to the moving part 12 corresponds to an N pole. A side (the negative direction side of the z axis) of the permanent magnet 150 which is closer to the cores 31 and 32 corresponds to an S pole. However, the N pole and the S pole may be reversed.

Figure 2:
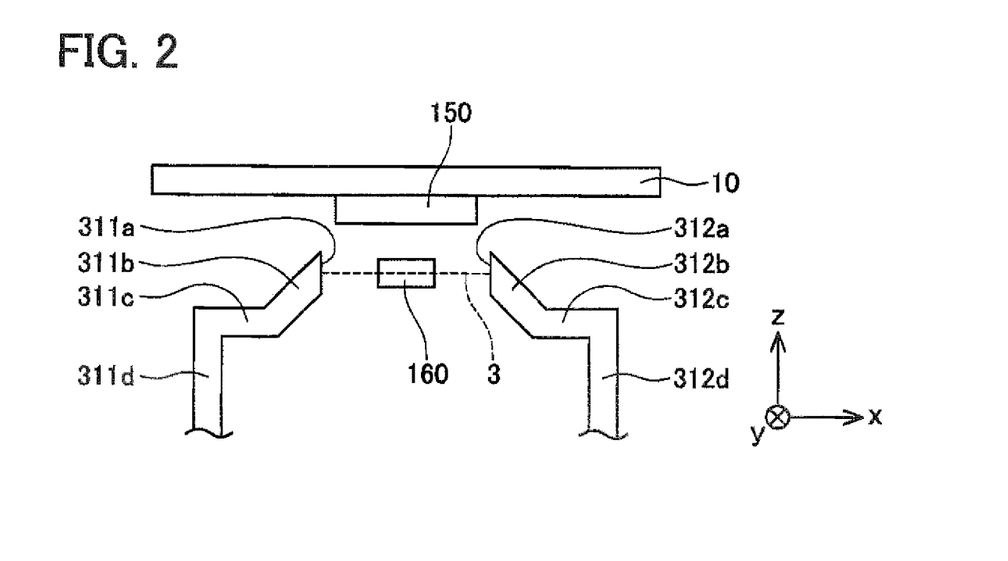
FIG. 2 is a diagram conceptually showing a part of the light deflector 1 as viewed from a side of the light deflector 1.
Figure 3:
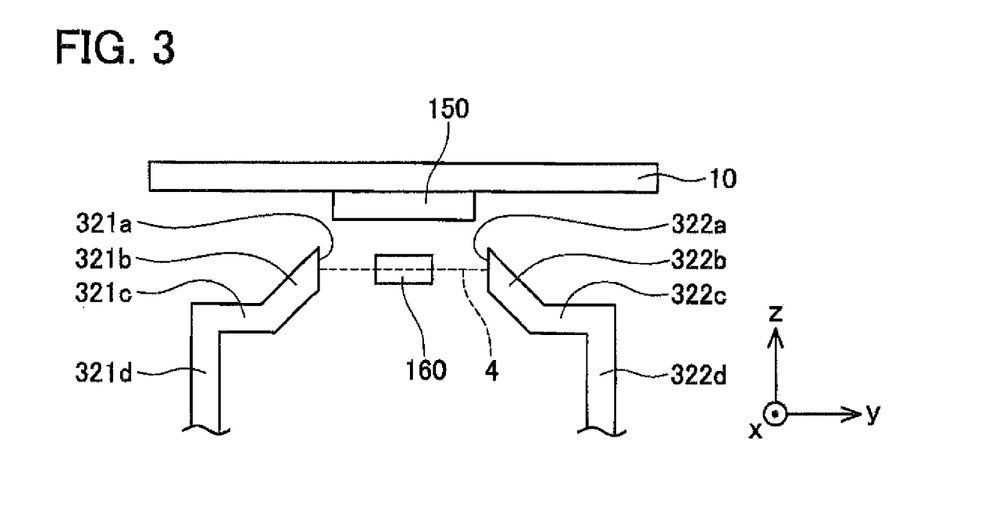
FIG. 3 is a diagram conceptually showing a part of the light deflector 1 as viewed from a side of the light deflector 1.

As shown in FIG. 2 and FIG. 3, a magnetic field detector 160 is disposed below the permanent magnet 150. The magnetic field detector 160 is a Hall element but is not limited to the Hall element. The magnetic field detector 160 is installed at a position and in a direction where the magnetic field detector 160 can detect a magnetic flux density in the z axis direction. A constant current in the x axis direction flows through the magnetic field detector 160. When a magnetic field in the z axis direction acts on the magnetic field detector 160, a voltage is generated in the y axis direction. Detection of the voltage generated in the y axis direction allows the magnetic flux density in the z axis direction to be detected. Tilting of the moving part 12 changes the magnetic flux density in the z axis direction in the magnetic field detector 160, changing an output voltage from the magnetic field detector 160. This allows the tilt angle of the moving part 12 to be detected. A frequency at which the mirror structure is tilted around the x axis is different from a frequency at which the mirror structure is tilted around the y axis. Thus, the tilt angle of the moving part can be detected for two tilt axes using the one magnetic field detector 160.

As shown in FIG. 1 to FIG. 3, the core 31 includes magnetic poles 311a and 312a disposed opposite each other across the magnetic field detector 160, first lateral extending portions 311b and 311c extending from the magnetic pole 311a in a negative direction of the x axis away from the magnetic field detector 160, a first longitudinal extending portion 311d bent and extending from the first lateral extending portion 311c in the negative direction of the z axis away from the upper substrate 10, second lateral extending portions 312b and 312c extending from the magnetic pole 312a in a positive direction of the x axis away from the magnetic field detector 160, a second longitudinal extending portion 312d bent and extending from the second lateral extending portion 312c in the negative direction of the z axis away from the upper substrate 10, and a connecting portion 31e connecting the first longitudinal extending portion 311d and the second longitudinal extending portion 312d. The core 31 is symmetric with respect to a yx plane passing through the center of the core 31 in the x direction.

The core 32 includes magnetic poles 321a and 322a disposed opposite each other across the magnetic field detector 160, first lateral extending portions 321b and 321c extending from the magnetic pole 321a in a negative direction of the y axis away from the magnetic field detector 160, a first longitudinal extending portion 321d bent and extending from the first lateral extending portion 321c in the negative direction of the z axis away from the upper substrate 10, second lateral extending portions 322b and 322c extending from the magnetic pole 322a in a positive direction of the y axis away from the magnetic field detector 160, a second longitudinal extending portion 322d bent and extending from the second lateral extending portion 322c in the negative direction of the z axis away from the substrate 10, and a connecting portion 32e connecting the first longitudinal extending portion 321d and the second longitudinal extending portion 322d. The core 32 is symmetric with respect to a zx plane passing through the center of the core 32 in the y direction. A coil not shown in the drawings is preferably wound around at least one of the first longitudinal extending portion 311d and 321d, the second longitudinal extending portion 312d and 322d, and the connecting portion 31e and 32e of the core 31 and 32.

The first lateral extending portions 311c and 321c and the second lateral extending portions 312c and 322c are flat portions parallel to the upper substrate 10. The first lateral extending portions 311b and 321b and the second lateral extending portions 312b and 322b extend obliquely upward from the first lateral extending portions 311c and 321c and the second lateral extending portion 312c and 322c toward the magnetic poles 311a, 321a, 312a, and 322a (that is, toward the magnetic field detector 160) and approach the upper substrate 10 as the first lateral extending portions 311b and 321b and the second lateral extending portions 312b and 322b extend further toward the magnetic poles 311a, 321a, 312a, and 322a. In the description, for convenience, a direction generally perpendicular to the upper substrate 10 is referred to as "longitudinal", and a direction generally along a planar direction is referred to as "lateral". The "lateral extending portion" and the "longitudinal extending portion" need not cross at right angles. Furthermore, FIG. 1 shows that the upper substrate 10 is disposed in an upper side of the light deflector 1 and that the cores 31 and 32 are disposed in a lower side of the light deflector 1. However, the light deflector 1 is not limited to this installation direction.

Figure 4:
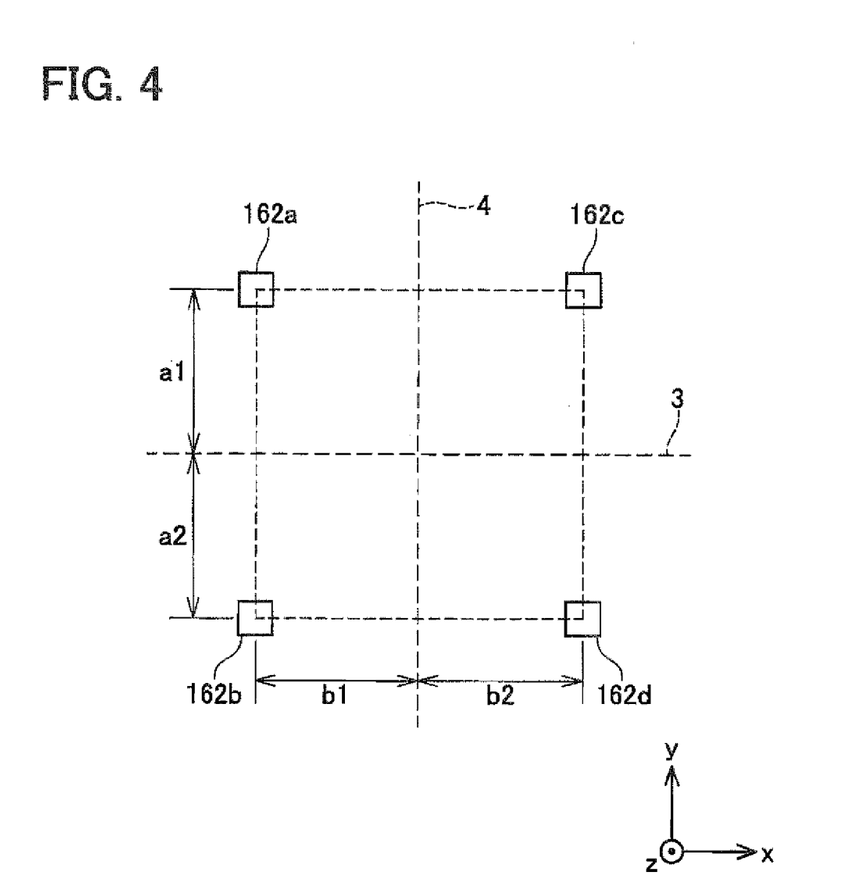
FIG. 4 is a diagram conceptually showing an example of disposition of a magnetic field detector.

The magnetic field detector may be disposed where a magnetic field for driving the moving part has a zero z component. In a specific example, for example, the magnetic pole 311a and the magnetic pole 312a are disposed opposite each other across the magnetic field detector 160. A line 3 joining the centers of cross sections of the magnetic pole 311a and the magnetic pole 312a together passes through a central position of the magnetic field detector 160 in both the y direction and the z direction. The magnetic pole 321a and the magnetic pole 322a are disposed opposite each other across the magnetic field detector 160. A line 4 joining the centers of cross sections of the magnetic pole 321a and the magnetic pole 322a together passes through a central position of the magnetic field detector 160 in both the x direction and the z direction. Alternatively, for example, four magnetic field detectors 162a to 162d may be disposed as shown in FIG. 4. In this case, a central position of the four magnetic field detectors 162a to 162d coincides with the positions of the line 3 and the line 4 in the z direction. Moreover, the magnetic field detectors 162a to 162d are disposed to establish relations a1=a2 and b1=b2 where the distance between a central position of the magnetic field detector 162a in an xy direction and each of the line 3 and the line 4 is denoted by a1 and b1, respectively, the distance between a central position of the magnetic field detector 162b in the xy direction and each of the line 3 and the line 4 is denoted by a2 and b1, respectively, the distance between a central position of the magnetic field detector 162c in an xy direction and each of the line 3 and the line 4 is denoted by a1 and b2, respectively, and the distance between a central position of the magnetic field detector 162d in the xy direction and each of the line 3 and the line 4 is denoted by a2 and b2, respectively. Then, the magnetic field detectors 162a to 162d can be disposed such that the sum of position vectors of the magnetic field detectors 162a to 162d from the intersection point between the line 3 and the line 4 is zero. Even when a plurality of magnetic field detectors is thus disposed and output values of the magnetic field detectors are differentiated, the tilt angle of the moving part can be detected for two tilt axes.

When a current flows through the coil on the core 31, the magnetic poles 311a and 312a apply a magnetic field acting in the x axis direction to the permanent magnet 150 to twist the flexible beams 111a and 111b, thus tilting the supporting frame 112 around the y axis relative to the upper substrate 10. When a current flows through the coil on the core 32, the magnetic poles 321a and 322a apply a magnetic field acting in the y axis direction to the permanent magnet 150 to twist the flexible beams 121a and 121b, thus tilting the mirror structure 140 around the x axis. The directions and angles in and through which the supporting frame 12 and the mirror structure 140 are tilted can be controlled by controlling the directions and magnitudes of the currents flowing through the coils on the cores 31 and 32. Preferably, a current with a frequency different from the resonant frequency of the twist of the mirror structure around the y axis flows through the coil on the core 31, and a current with a frequency different from the resonant frequency of the twist of the mirror structure around the x axis flows through the coil on the core 32. However, the present invention is not limited to this configuration.

The distance between each of the first lateral extending portions 311c and 321c and the second lateral extending portions 312c and 322c and the upper substrate 10 in the z direction is longer than the distance between a tip of the moving part 12 and the upper substrate 10 in the z direction when the moving part 12 maximally tilts relative to the upper substrate 10. The first lateral extending portions 311b and 321b and the second lateral extending portions 312b and 322b extend obliquely upward toward the magnetic field detector 160. Thus, the distance between the permanent magnet 150 and the magnetic field detector 160 in the z direction can be made shorter than the distance between the tip of the moving part 12 and the upper substrate 10 in the z direction when the moving part 12 maximally tilts relative to the upper substrate 10.

As described above, the pair of magnetic poles 311a and 312a and the pair of magnetic poles 321a and 322a are disposed on a lower surface side (the negative direction side of the z axis) of the light deflector 1 on which the permanent magnet 150 of the moving part 12 is provided. The magnetic poles 311a and 312a lie opposite each other across the magnetic field detector 160, whereas the magnetic poles 321a and 322a lie opposite each other across the magnetic field detector 160. The pair of magnetic poles 311a and 312a and the pair of magnetic poles 321a and 322a are disposed such that the magnetic poles 311a and 312a lie close to the permanent magnet 150 and opposite each other across the magnetic field detector 160, whereas the magnetic poles 321a and 322a lie close to the permanent magnet 150 and opposite each other across the magnetic field detector 160. Thus, the magnetic field detector 160 can accurately detect the tilt angle of the moving part 12 without reducing a driving force for tilting the moving part 12. Furthermore, since the distance between the magnetic poles 311a and 312a in the x direction and the distance between the magnetic poles 321a and 322a in the y direction are shorter than the lengths of the moving part 12 in the x direction and the y direction, respectively, the sizes of the cores 31 and 32, including the magnetic poles 311a and 312a and the magnetic poles 321a and 322a, respectively, can be reduced. This allows the light deflector 1 to be miniaturized.

Furthermore, in the light deflector 1, the first lateral extending portions 311b and 321b and the second lateral extending portions 312b and 322b extend obliquely upward toward the magnetic field detector 160. Thus, the distance between the permanent magnet 150 and the magnetic field detector 160 in the z direction can be made shorter than the distance between the tip of the moving part 12 and the upper substrate 10 in the z direction when the moving part 12 maximally tilts relative to the upper substrate 10. Since the permanent magnet 150 and the magnetic field detector 160 can be disposed in proximity to each other, even when the magnetic field detector 160 is placed on the lines 3 and 4 extending through the centers of the surfaces of the magnetic poles 311a, 312a and 321a, 322a, respectively, the permanent magnet 150 can be disposed close to the lines 3 and 4. This allows the driving force for the moving part 12 to be reliably exerted. The shape in which the first lateral extending portions 311b and 321b and the second lateral extending portions 312b and 322b extend obliquely upward is useful for a light deflector without the magnetic field detector 160. Since the distance between the permanent magnet 150 and each of the magnetic poles 311a, 312a, 321a, and 322a can be made shorter than the distance between the moving part 12 and the upper substrate 10 when the moving part 12 maximally tilts relative to the upper substrate 10, the permanent magnet 150 can be disposed closer to each of the magnetic poles 311a, 312a, 321a, and 322a. This enables an increase in the driving force for the moving part 12.

Furthermore, in the light deflector 1, the magnetic field detector 160 is fixed to the lower substrate 20, and the cores 31 and 32 are fixed to the upper substrate 10 via the lower substrate 20. Moreover, the lower substrate 20 is fixed to the cores 31 and 32 on the first lateral extending portions 311c and 321c and the second lateral extending portions 312c and 322c, which are flat portions of the cores 31 and 32. Thus, the position in the z direction is easily adjusted. This allows the position of the magnetic field detector 160 in the z direction to be easily adjusted.

(Variations)

Figure 5:
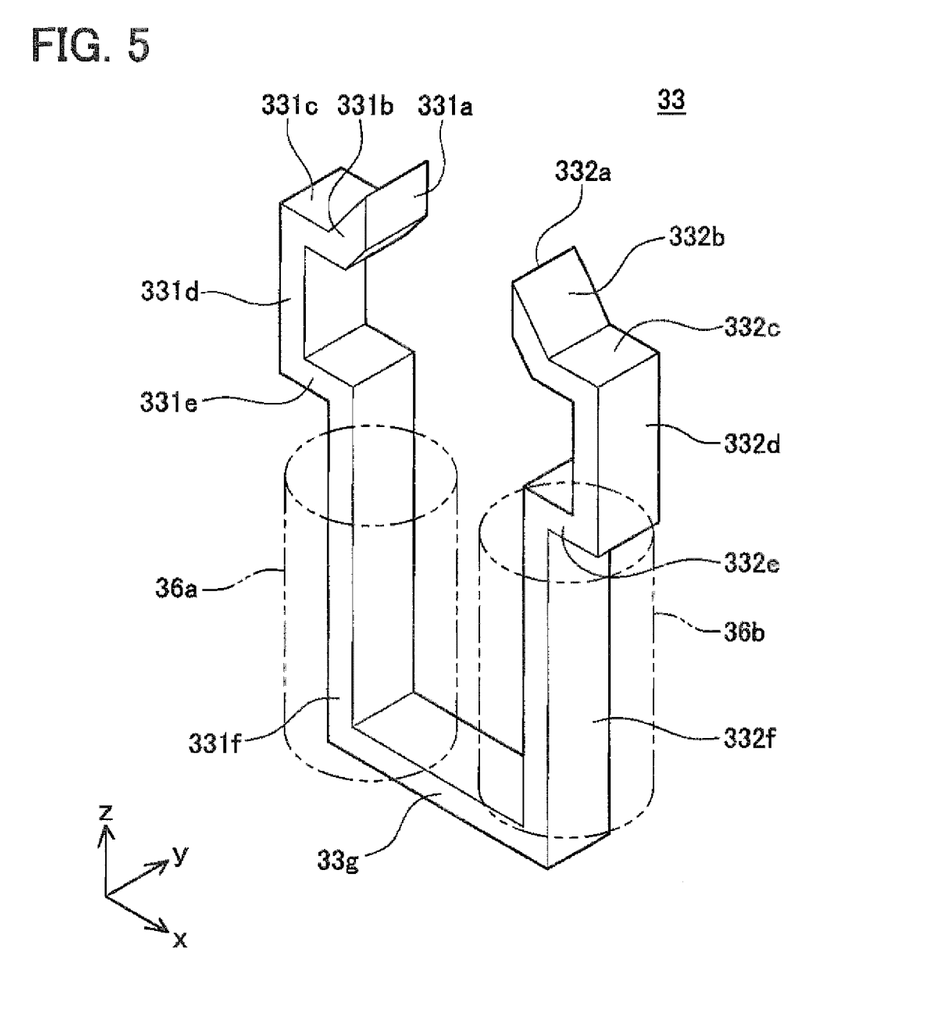
FIG. 5 is a perspective view showing a core used in a light deflector according to a variation.

FIG. 5 shows a core 33 according to a variation of the light deflector 1. The core 33 includes a third lateral extending portion 331e bent and extending from the first longitudinal extending portion 331d in the positive direction of the x axis, a third longitudinal extending portion 331f bent and extending from the third lateral extending portion 331e in the negative direction of the z axis, a fourth lateral extending portions 322e bent and extending from the second longitudinal extending portion 332d in the negative direction of the x axis, a fourth longitudinal extending portion 332f bent and extending from the fourth lateral extending portion 322e in the negative direction of the z axis, and a tip connecting portion 33g connecting tips of the third longitudinal extending portion 331f and the fourth longitudinal extending portion 332f in the negative direction of the z axis. The aspects of the magnetic poles 331a and 332a, the first lateral extending portions 331b and 331c, the first longitudinal extending portion 331d, the second lateral extending portions 332b and 332c, and the second longitudinal extending portion 332d are similar to the aspects of the magnetic poles 311a and 312a, the first lateral extending portions 311b and 311c, the first longitudinal extending portion 311d, the second lateral extending portions 312b and 312c, and the second longitudinal extending portion 312d as shown in FIG. 1 to FIG. 3. Thus, the aspects will not be described.

As shown by imaginary lines, coils 36a and 36b are wound around the third longitudinal extending portion 331f and the fourth longitudinal extending portion 332f, respectively. The distance between the third longitudinal extending portion 331f and the fourth longitudinal extending portion 332f in the x direction is shorter than the distance between the first longitudinal extending portion 331d and the second longitudinal extending portion 332d in the x direction. Thus, this difference in distance serves as a winding margin for the coils, and prevents a space in the x direction from being excessively large even when the coils 36a and 36b are wound. The core 33 prevents the light deflector from being excessively large even with an increased number of coils.

An example of a method for easily winding the coils 36a and 36b around the core 33, though the present invention is not limited to this method. For example, first, the core 33 is cut in the x direction along an upper surface (a surface in the positive direction of the z axis) of the tip connecting portion 33g to separate the tip connecting portion 33g from the third longitudinal extending portion 331f and the fourth longitudinal extending portion 332f. Then, the coils 36a and 36b are wound around the third longitudinal extending portion 331f and the fourth longitudinal extending portion 332f, respectively. The cut surfaces are welded or bonded together again. Thus, the coils 36a and 36b can be easily wound. When the tip connecting portion 33g is cut off from the third longitudinal extending portion 331f and the fourth longitudinal extending portion 332f, the core 33 may be cut in the z direction but is preferably cut in the x direction as described above. When the core 33 is cut in the z direction, the cutting, for example, reduces the core 33 in length in the x direction, resulting in a high likelihood of a change in the distance between the magnetic poles 331a and 332a. When the core 33 is cut in the x direction, the distance between the magnetic poles 331a and 332a in the x direction is maintained in spite of a possible reduction in the length of the core 33 in the z direction. Consequently, the performance of the electromagnet using the core 33 can be easily ensured.

Figure 6:
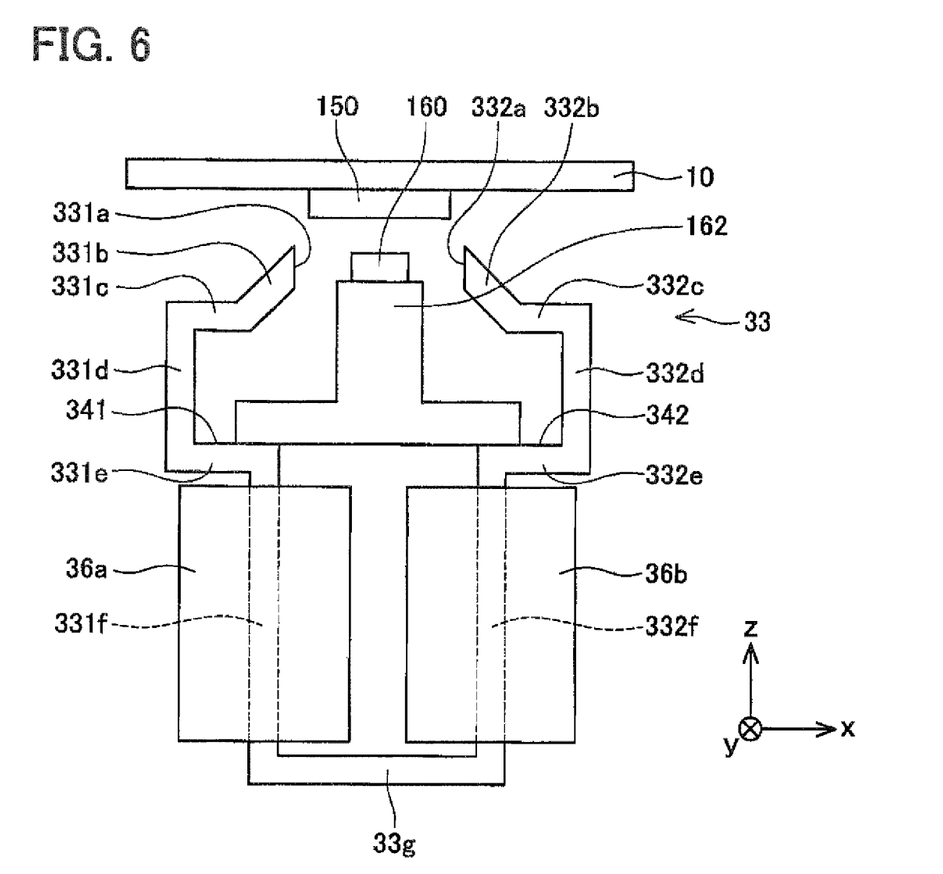
FIG. 6 is a diagram conceptually showing a part of a light deflector according to a variation as viewed from a side of the light deflector.

The MEMS device may further include a supporting member that supports the magnetic field detector at a position between the first magnetic pole and the second magnetic pole of the core. The supporting member may be disposed between the first longitudinal extending portion and second longitudinal extending portion. In this case, the supporting member may be supported by the third lateral extending portion and fourth lateral extending portion of the core. Furthermore, the third lateral extending portion and fourth lateral extending portion of the core can be utilized as a reference for determining the relative position between the core and the mirror structure or the relative position between cores if a plurality of cores is provided. For example, as shown in FIG. 6, the light deflector 1 may further include a supporting member 162 that supports the magnetic field detector 160 at a position between the magnetic pole 331a and magnetic pole 332a of the core 33. The supporting member 162 is disposed between the first longitudinal extending portion 331d and the second longitudinal extending portion 332d and mounted on an upper surface 341 of the third lateral extending portion 331e and on an upper surface 342 of the fourth lateral extending portion 332e. The magnetic field detector 160 is supported by the supporting member 162 and the third lateral extending portion 331e and fourth lateral extending portion 332e, which support the supporting member 162. Thus, the magnetic field detector 160 can be easily positioned.

Figure 7:
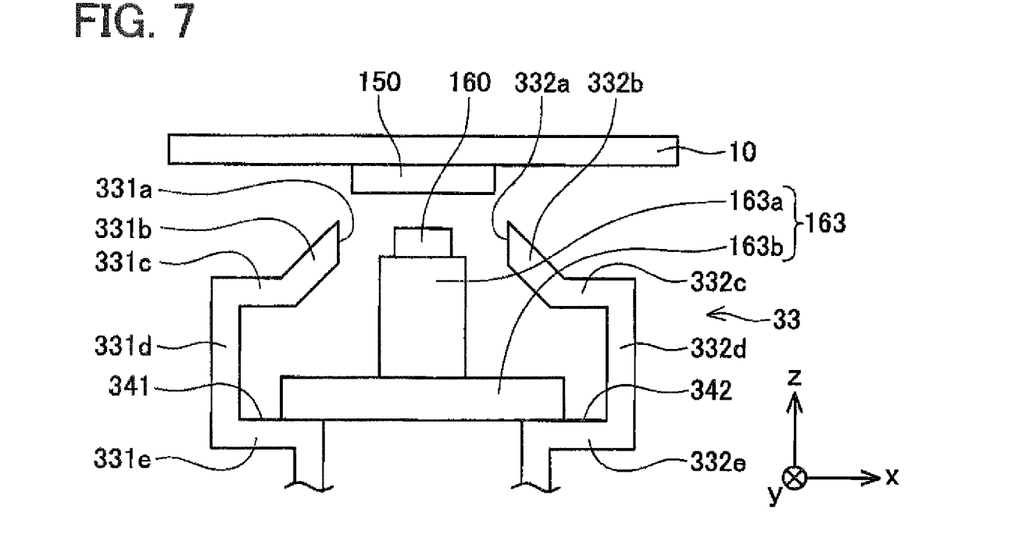
FIG. 7 is a diagram conceptually showing a part of a light deflector according to a variation as viewed from a side of the light deflector.

Furthermore, the supporting member may include a circuit board electrically connected to the magnetic field detector and a spacer extending from the circuit board to between the first magnetic pole and second magnetic pole of the core. For example, as show in FIG. 7, a supporting member 163 may include a circuit board 163b electrically connected to the magnetic field detector 160 and a spacer 163a extending from the circuit board 163b to between the magnetic pole 331a and magnetic pole 332a of the core 33. For example, when the circuit board 163b is mounted on the upper surface 341 of the third lateral extending portion 331e of the core 33 and on the upper surface 342 of the fourth lateral extending portion 332e of the core 33, and the magnetic field detector 160 is disposed to the magnetic pole 331a and magnetic pole 332a, the magnetic field detector 160 can be installed at an appropriate position by fixing the spacer 163a on the circuit board 163b and fixing the magnetic field detector 160 to an upper surface of the spacer 163a. If a space near the magnetic field detector 160 is insufficient to install the circuit board 163b therein, the use of the spacer 163a allows the circuit board 163b and the magnetic field detector 160 to be arranged away from each other.

Figure 8:
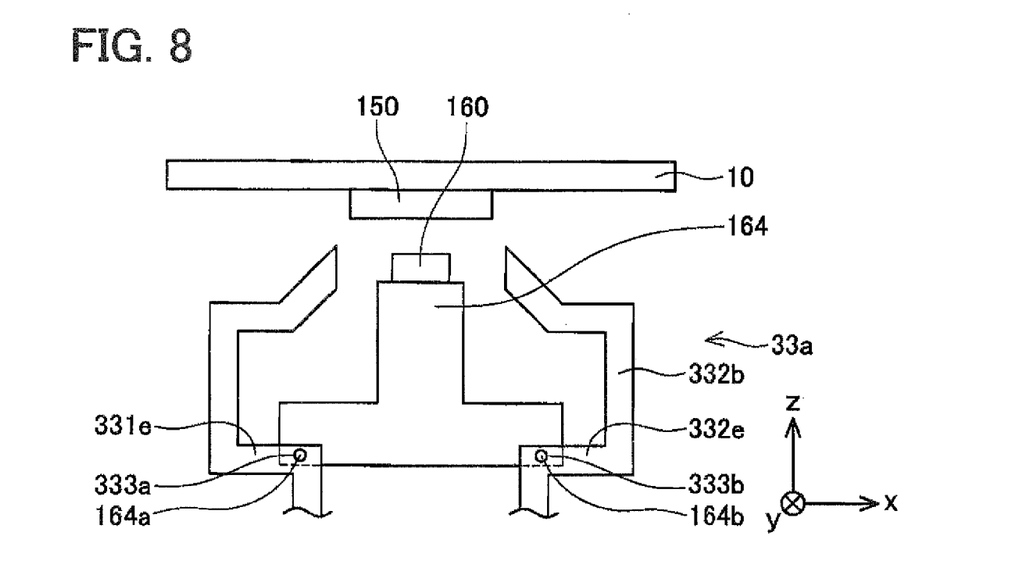
FIG. 8 is a diagram conceptually showing a part of a light deflector according to a variation as viewed from a side of the light deflector.

Furthermore, a hole portion for fixation may be formed in at least one of the supporting member and the core, and an insertion portion may be provided on the other for insertion into the hole portion. Moreover, the insertion portion may be formed of a nonmagnetic material. The hole portion for fixation is desirably formed where the position of the hole portion does not serve to increase the magnetic resistance of the core. Additionally, the hole portion may be utilized as a reference for determining the relative position between the core and the mirror structure or the relative position between cores if a plurality of cores is provided. For example, as shown in FIG. 8, a core 33a may be provided which includes hole portions 333a and 333b in which a supporting member 164 is fixed. The remaining part of the structure of the core 33a is similar to the corresponding part of the structure of the core 33, and will thus not be described. The hole portions 333a and 333b are formed in a bent corner portion at a tip of the third lateral extending portion 331e in the positive direction of the x axis and in a bent corner portion at a tip of the fourth lateral extending portion 332e in the negative direction of the x axis. This enables a reduction in the adverse effect of the hole portions 333a and 333b on lines of magnetic force from the core 33a. The supporting member 164 includes insertion portions 164a and 164b for insertion into the hole portions 333a and 333b. The insertion portions 164a and 164b are formed of a nonmagnetic material. Furthermore, the insertion portions may be pins independent of the supporting member. The supporting member 164 can be easily aligned with and fixed to the core 33a by inserting the insertion portions 164a and 164b into the hole portions 333a and 333b, respectively. Since the magnetic field detector 160 is fixed to the upper surface of the supporting member 164, the core 33a and the magnetic field detector 160 can be easily aligned with and fixed to each other via the supporting member 164.

Figure 9:
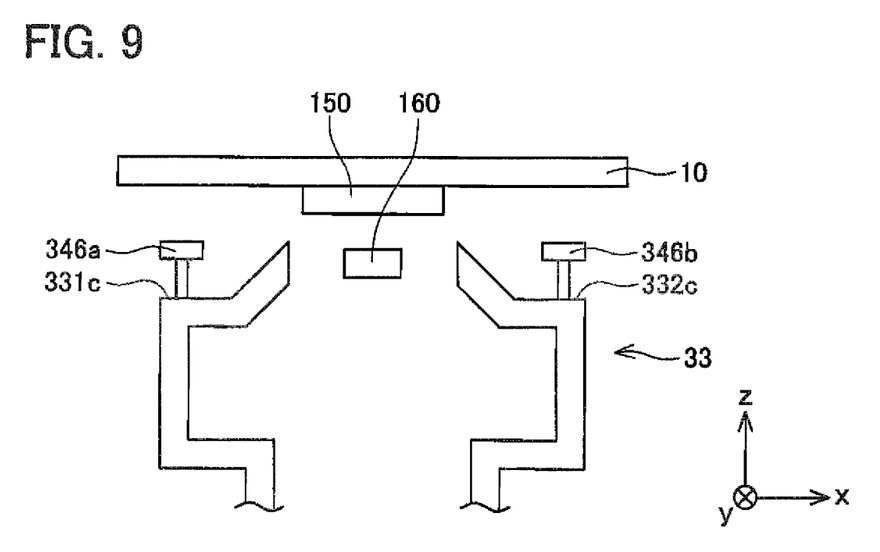
FIG. 9 is a diagram conceptually showing a part of a light deflector according to a variation as viewed from a side of the light deflector.

Furthermore, the first lateral extending portion of the core may have a first flat portion opposite and parallel to the substrate. The second lateral extending portion may have a second flat portion opposite and parallel to the substrate. In this case, a positioning member that defines a distance between the substrate and the core may be provided on at least one of the first flat portion and the second flat portion. For example, as shown in FIG. 9, positioning members 346a and 346b that define the distance between the substrate 10 and the core 33 may be provided on the first lateral extending portion 331c and the second lateral extending portion 332c, which are flat portions of the core 33. Additionally, the flat portions may be utilized to fix the core by pressing screws or the like against the flat portions.

In the light deflector 1, the lower substrate 20 is fixed to the flat portions of the cores 31 and 32. However, the cores 31 and 32 may be fixed using other portions. Furthermore, a part of the core according to the variations may be fixed to the lower substrate 20. For example, the third lateral extending portion 331e and the fourth lateral extending portion 332e of the core 33 may be fixed to the lower substrate 20. Alternatively, the hole portions 333a and 333b of the core 33a may be utilized to fix the core 33a to the lower substrate 20. Additionally, although the light deflector 1 includes two pairs of electromagnets each with a set of magnetic poles disposed opposite each other in the x direction and the y direction, the embodiments are not limited to this configuration. For example, the light deflector 1 may further include a third magnetic pole, and the magnetic field detector may be disposed between the first magnetic pole and the second magnetic pole and the third magnetic pole. For example, the electromagnet may have three magnetic poles disposed such that magnetic fluxes from the magnetic poles are directed at an angle of 120° to one another as viewed from above a plane perpendicular to the z axis, and the magnetic field detector may be disposed between the three magnetic poles. The angle between the three magnetic pole need not be 120°, and the light deflector may further include a driving magnetic pole.

What is claimed is:

1. A microelectromechanical systems (MEMS) device comprising:
   a substrate;
   a moving part including a magnetic material and configured to tilt relative to the substrate;
   a first magnetic pole and a second magnetic pole configured to apply a magnetic field to the magnetic material;
   a magnetic field detector configured to detect the magnetic field of the magnetic material;
   a core; and
   a coil wound around the core, wherein
   the first magnetic pole and the second magnetic pole are disposed on one side of the moving part, the one side being a side on which the magnetic material is located,
   the magnetic field detector is disposed between the first magnetic pole and the second magnetic pole, and
   a distance between the first magnetic pole and the second magnetic pole is shorter than a length of the moving part in a direction from the first magnetic pole toward the second magnetic pole,
   wherein the core includes:
      the first magnetic pole and the second magnetic pole disposed across the magnetic field detector;
      a first lateral extending portion extending from the first magnetic pole in a first direction of moving away from the magnetic field detector;
      a first longitudinal extending portion bent and extending from the first lateral extending portion in a second direction of moving away from the substrate;
      a second lateral extending portion extending from the second magnetic pole in an opposite direction to the first direction;
      a second longitudinal extending portion bent and extending from the second lateral extending portion in the second direction; and
      a connecting portion connecting the first longitudinal extending portion and the second longitudinal portion, and
   wherein the connecting portion includes:
      a third lateral extending portion bent and extending from the first longitudinal extending portion in the opposite direction to the first direction;
      a third longitudinal extending portion bent and extending from the third lateral extending portion in the second direction;
      a fourth lateral extending portion bending and extending from the second longitudinal extending portion in the first direction;
      a fourth longitudinal extending portion bent and extending from the fourth lateral extending portion in the second direction; and
      a tip connecting portion connecting a tip of third longitudinal extending portion in the second direction and a tip of the fourth longitudinal extending portion in the second direction, and
   wherein the coil is wound around the third longitudinal extending portion and the fourth longitudinal extending portion.

2. The MEMS device according to claim 1, further comprising:
   a supporting member supporting the magnetic field detector at a position between the first magnetic pole and the second magnetic pole of the core.

3. The MEMS device according to claim 1, wherein
   a distance between the magnetic material and the magnetic field detector is shorter than a distance between the moving part and the substrate when the moving part maximally tilts relative to the substrate.

4. The MEMS device according to claim 1, further comprising:
   a third magnetic pole, wherein
   the magnetic field detector is disposed between the first magnetic pole, the second magnetic pole, and the third magnetic pole.

5. A microelectromechanical systems (MEMS) device comprising:
   a substrate;
   a moving part including a magnetic material and configured to tilt relative to the substrate;
   a first magnetic pole and a second magnetic pole configured to apply a magnetic field to the magnetic material;
   a core; and
   a coil wound around the core,
   wherein both of a distance between the magnetic material and the first magnetic pole and a distance between the magnetic material and the second magnetic pole are shorter than a distance between the moving part and the substrate when the moving part maximally tilts relative to the substrate,
   wherein the core includes:
      the first magnetic pole and the second magnetic pole;
      a first lateral extending portion extending from the first magnetic pole in a first direction of moving away from the magnetic material;
      a first longitudinal extending portion bent and extending from the first lateral extending portion in a second direction of moving away from the substrate;
      a second lateral extending portion extending from the second magnetic pole in an opposite direction to the first direction;
      a second longitudinal extending portion bent and extending from the second lateral extending portion in the second direction; and
      a connecting portion connecting the first longitudinal extending portion and the second longitudinal portion, and
   wherein the connecting portion includes:
      a third lateral extending portion bent and extending from the first longitudinal extending portion in the opposite direction to the first direction;
      a third longitudinal extending portion bent and extending from the third lateral extending portion in the second direction;
      a fourth lateral extending portion bending and extending from the second longitudinal extending portion in the first direction;
      a fourth longitudinal extending portion bent and extending from the fourth lateral extending portion in the second direction; and
      a tip connecting portion connecting a tip of third longitudinal extending portion in the second direction and a tip of the fourth longitudinal extending portion in the second direction, and
   wherein the coil is wound around the third longitudinal extending portion and the fourth longitudinal extending portion.

* * * * *